United States Patent [19]
Turcheck, Jr. et al.

[11] Patent Number: 5,233,328
[45] Date of Patent: Aug. 3, 1993

[54] METHOD FOR PROCESSING COMPACTED DATA

[75] Inventors: Stanley P. Turcheck, Jr., Homer City; Randy K. Baird, Bolivar; James P. Martin, Blairsville, all of Pa.

[73] Assignee: FMC Corporation, Chicago, Ill.

[21] Appl. No.: 583,117

[22] Filed: Sep. 17, 1990

[51] Int. Cl.⁵ .................................................. G06F 7/02
[52] U.S. Cl. .................................................. 340/146.2
[58] Field of Search ...................... 340/146.2; 364/769

[56] References Cited

U.S. PATENT DOCUMENTS

| | | | |
|---|---|---|---|
| 4,642,813 | 2/1987 | Wilder | 382/8 |
| 4,678,920 | 7/1987 | Iadipaolo et al. | 356/376 X |
| 4,711,579 | 12/1987 | Wilkinson | 356/375 |
| 4,858,156 | 8/1989 | Martin | 356/240 X |
| 4,935,714 | 6/1990 | McClure | 340/146.2 |
| 4,958,140 | 9/1990 | Yasuda et al. | 340/146.2 |
| 4,961,067 | 10/1990 | Suzuki | 340/146.2 |
| 5,031,147 | 7/1991 | Maruyama et al. | 340/146.2 X |
| 5,059,942 | 10/1991 | Burrows | 340/146.2 |

OTHER PUBLICATIONS

Chin et al., "Automated Visual Inspection: A Survey", IEEE Trans. on Pattern Analysis and Machine Intelligence, vol. PAMI-4, No. 6, Nov. 1982, pp. 557-573.
Tsukamoto, "Optical Inspection System for Mask Pattern", Proceedings of the International Conference on Industrial Electronics, Control and Instrumentation, Tokyo, Japan, Oct. 22-26, 1984; IEEE Press, vol. 2, New York (US), pp. 1032-1035.

*Primary Examiner*—Tan V. Mai
*Attorney, Agent, or Firm*—Michael Lee; R. C. Kamp; R. B. Megley

[57] ABSTRACT

A method for processing compacted data without converting the data into uncompacted form. A first set of digital data is converted into compact form by recording a set of points at which the signal level changes. A second set of digital data is likewise converted into compact form by recording the points of signal level change. A logic function is then used to compare the first set of compact data with the second set of compact data.

3 Claims, 5 Drawing Sheets

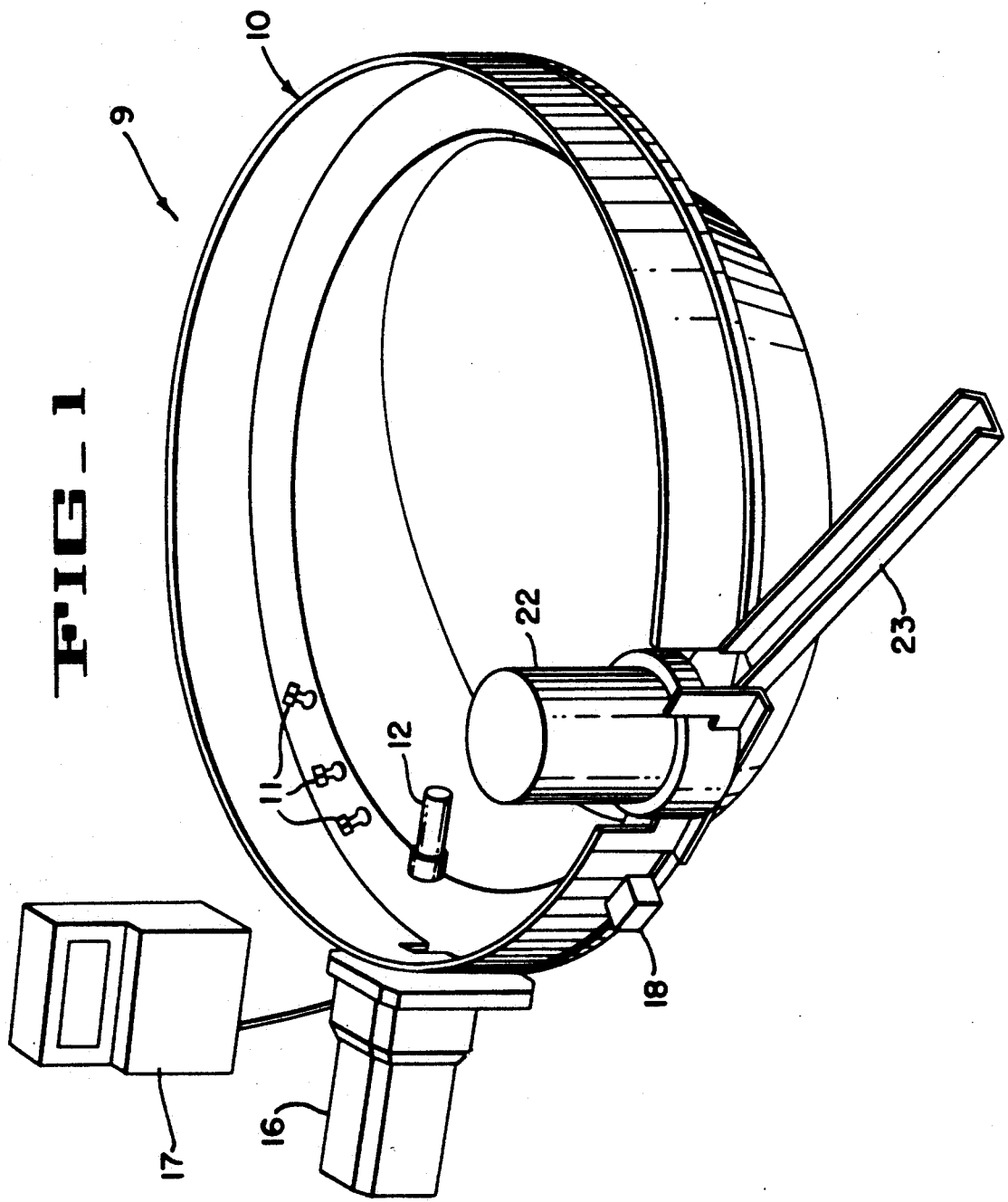
FIG_1

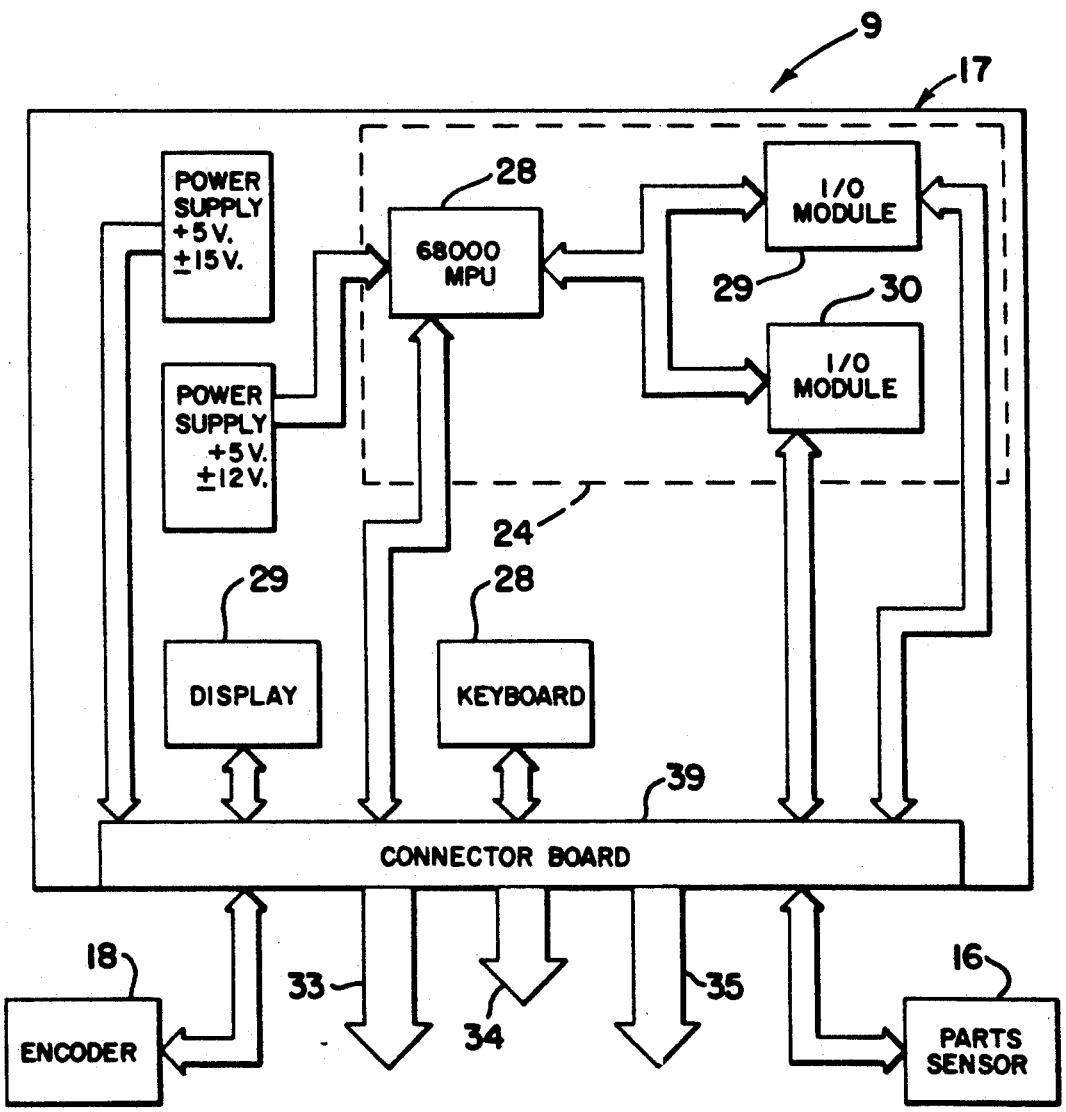

FIG_3
UNCOMPACTED BINARY DATA
| TIME | DATA 1 | DATA 2 | DATA 3 (OR) |
|---|---|---|---|
| 0 | 0 | 0 | 0 |
| 1 | 0 | 1 | 1 |
| 2 | 0 | 1 | 1 |
| 3 | 1 | 1 | 1 |
| 4 | 1 | 1 | 1 |
| 5 | 1 | 1 | 1 |
| 6 | 1 | 1 | 1 |
| 7 | 1 | 1 | 1 |
| 8 | 1 | 0 | 1 |
| 9 | 0 | 0 | 0 |
| 10 | 0 | 0 | 0 |
| 11 | 0 | 1 | 1 |
| 12 | 1 | 1 | 1 |
| 13 | 1 | 1 | 1 |
| 14 | 0 | 1 | 1 |
| 15 | 0 | 0 | 0 |
| 16 | 0 | 0 | 0 |
| 17 | 0 | 1 | 1 |
| 18 | 0 | 0 | 0 |
| 19 | 0 | 0 | 0 |
| 20 | 0 | 0 | 0 |
FIG_4
COMPACTED BINARY DATA
TRANSITION VALUES
| DATA 1 | DATA 2 | DATA 3 |
|---|---|---|
| 3 | 1 | 1 |
| 9 | 8 | 9 |
| 12 | 11 | 11 |
| 14 | 15 | 15 |
|  | 17 | 17 |
|  | 18 | 18 |
FIG_5
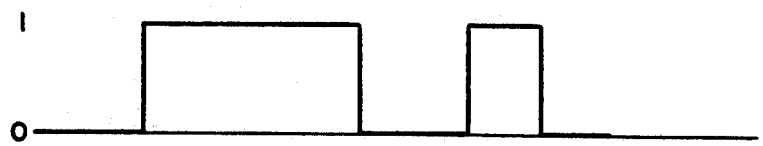
BINARY DATA 1
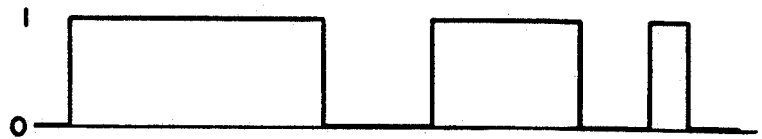
BINARY DATA 2
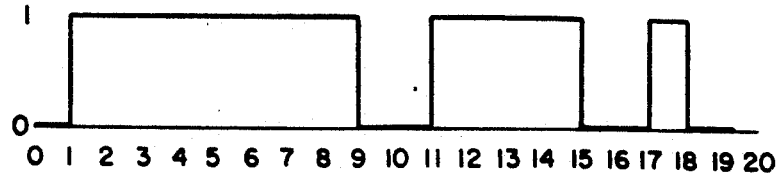
BINARY DATA 3 (1 & 2 OR'd)

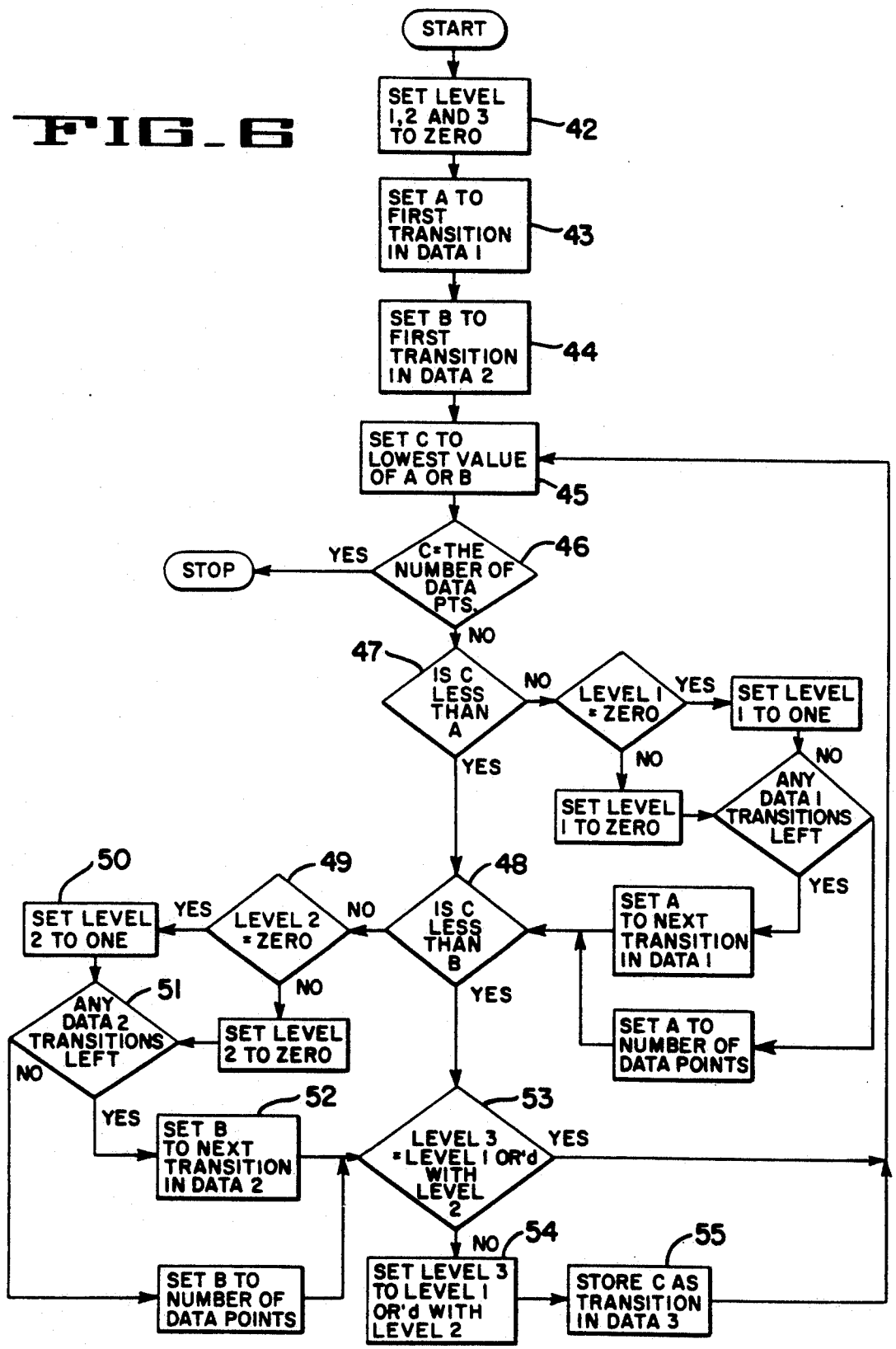

FIG_7
UNCOMPACTED BINARY DATA

| TIME | DATA 1 | DATA 2 | DATA 3 (AND) |
|---|---|---|---|
| 0 | 0 | 0 | 0 |
| 1 | 0 | 1 | 0 |
| 2 | 0 | 1 | 0 |
| 3 | 1 | 1 | 1 |
| 4 | 1 | 1 | 1 |
| 5 | 1 | 1 | 1 |
| 6 | 1 | 1 | 1 |
| 7 | 1 | 1 | 1 |
| 8 | 1 | 0 | 0 |
| 9 | 0 | 0 | 0 |
| 10 | 0 | 0 | 0 |
| 11 | 0 | 1 | 0 |
| 12 | 1 | 1 | 1 |
| 13 | 1 | 1 | 1 |
| 14 | 0 | 1 | 0 |
| 15 | 0 | 0 | 0 |
| 16 | 0 | 0 | 0 |
| 17 | 0 | 1 | 0 |
| 18 | 0 | 0 | 0 |
| 19 | 0 | 0 | 0 |
| 20 | 0 | 0 | 0 |

FIG_8
COMPACTED BINARY DATA
TRANSITION VALUES

| DATA 1 | DATA 2 | DATA 3 |
|---|---|---|
| 3 | 1 | 3 |
| 9 | 8 | 8 |
| 12 | 11 | 12 |
| 14 | 15 | 14 |
|  | 17 |  |
|  | 18 |  |

FIG_9
UNCOMPACTED BINARY DATA

| TIME | DATA 1 | DATA 2 | DATA 3 (E OR) |
|---|---|---|---|
| 0 | 0 | 0 | 0 |
| 1 | 0 | 1 | 1 |
| 2 | 0 | 1 | 1 |
| 3 | 1 | 1 | 0 |
| 4 | 1 | 1 | 0 |
| 5 | 1 | 1 | 0 |
| 6 | 1 | 1 | 0 |
| 7 | 1 | 1 | 0 |
| 8 | 1 | 0 | 1 |
| 9 | 0 | 0 | 0 |
| 10 | 0 | 0 | 0 |
| 11 | 0 | 1 | 1 |
| 12 | 1 | 1 | 0 |
| 13 | 1 | 1 | 0 |
| 14 | 0 | 1 | 1 |
| 15 | 0 | 0 | 0 |
| 16 | 0 | 0 | 0 |
| 17 | 0 | 1 | 1 |
| 18 | 0 | 0 | 0 |
| 19 | 0 | 0 | 0 |
| 20 | 0 | 0 | 0 |

FIG_10
COMPACTED BINARY DATA
TRANSITION VALUES

| DATA 1 | DATA 2 | DATA 3 |
|---|---|---|
| 3 | 1 | 1 |
| 9 | 8 | 3 |
| 12 | 11 | 7 |
| 14 | 15 | 8 |
|  | 17 | 11 |
|  | 18 | 12 |
|  |  | 14 |
|  |  | 15 |
|  |  | 17 |
|  |  | 18 |

METHOD FOR PROCESSING COMPACTED DATA

CROSS-REFERENCE TO RELATED APPLICATIONS

Details of a parts inspection system in which the present invention can be used are disclosed in a patent application entitled "HIGH-RESOLUTION VISION SYSTEM FOR PART INSPECTION" and filed in the United States Patent and Trademark Office on even date herewith.

BACKGROUND OF THE INVENTION

The present invention relates to a method for processing compacted data, and more particularly, to a method for comparing a first set of digital data in compact form with a second set of digital data in compact form in order to process extremely large amounts of data.

Mechanical parts are commonly inspected for defects and for variations from standard size and shapes before being placed into machinery. When a mechanical visual inspection is used a standard part may be inspected and the specification of this standard part placed in some type of storage. The vision system then inspects a plurality of similar mechanical parts and compares each of the inspected parts with specifications of the standard parts. In order to provide an accurate an complete inspection a very large number of bits of information about each of the inspected parts must be compared with a very large number of bits of information about the standard part. Such a process is slow and expensive.

SUMMARY OF THE INVENTION

The invention discloses a method for compacting a set of digital data generated from the inspection of a standard part by recording a set of points at which the standard set of digital data changes signal level. The compacted digital data from the standard part is stored in a memory. As each part is inspected the digital data generated is compacted by recording a set of points at which the data changes signal level. The compacted data from each tested part is compared with the compacted data from the standard part to determine if the tested part is acceptable. A method of comparison is to use a logic function to combine the compacted data from the standard part with the compacted data from the tested part to obtain a third set of compacted data. The third set of compacted data is then examined to determine if it is within acceptable limits. The logic function used to obtain the third set of compacted data can be one of a variety of functions, such as OR logic, AND logic and Exclusive OR logic.

BRIEF DESCRIPTION OF THE DRAWINGS

FIG. 1 is an illustration of a parts inspection apparatus which uses a method of comparing sets of compacted digital data of the present invention.

FIG. 2 is a block diagram of circuitry for using compacted digital data to inspect parts.

FIG. 3 illustrates the combining of pair of sets of uncompacted data using an OR function.

FIG. 4 illustrates the combining of a pair of sets of compacted data using an OR function.

FIG. 5 is a graphic representation of the sets of data shown in FIG. 3.

FIG. 6 is a flow chart of a method of processing the compacted data of FIG. 4.

FIG. 7 illustrates the combining of a pair of sets of data using an AND function.

FIG. 8 illustrates the combining of a pair of sets of compacted data using an AND function.

FIG. 9 illustrates the combining of a pair of sets of data using an Exclusive OR function.

FIG. 10 illustrates the combining of a pair of sets of compact data using an Exclusive OR function.

DESCRIPTION OF THE PREFERRED EMBODIMENT

A vision inspection apparatus 9 in which the present invention can be used is disclosed in FIG. 1. A feeder 10 singulates a plurality of parts 11 which are moved past a light source 12 and a geometric parts sensor 16. Parts sensor 16 senses the geometry of each part and provides signals to a vision controller and interface 17. A position sensor 18 senses the position of each part 11 as it approaches a part diverter 22. Diverter 22 can be used to reorient parts or to move parts into an output trough 23.

Interface 17 (FIGS. 1, 2) includes a CPU controller 24 having a microprocessor 28 and a plurality of input-/output modules 29, 30. Parts sensor 16 includes a charged coupled device and a means (not shown) for digital signals which contain information concerning the size, shape and surface details of parts 11. A keyboard 28, a display device 29 and a plurality of output ports 33-35 are interconnected to controller 24 by a connector board 39.

An example of a small portion of a binary signal which could be developed by visual inspection apparatus 9 (FIGS. 1, 2) when a standard part is inspected is shown as binary data 1 of FIG. 5 and FIG. 3. A portion of the binary data developed by a tested part is shown as binary data 2 (FIGS. 3, 5). When data 1 and data 2 (FIGS. 3, 5) are combined by an OR circuit or by a CPU having an OR function, the binary information of data 3 is the result. When the uncompacted binary data of data 1, data 2 and data 3 are used a very large number of calculations and comparisons are required to check a tested part against a standard part resulting in long part inspection times.

Inspect time can be greatly reduced by compacting the data as shown in FIG. 4. The times at which signal levels change in data 1 and data 2 are listed in the left and center columns of FIG. 4. As seen in FIGS. 3 and 5 the level of data 1 changes at times 3, 9, 12 and 14, and the level of data 2 changes at times 1, 8, 11, 15, 17 and 18. The data 1 and data 2 columns (FIG. 4) can be used by an OR function of a CPU to obtain the data 3 information in a manner shown in the flow chart of FIG. 6.

The level of binary data 1, data 2 and data 3 are initially set to zero as shown in step 42 (FIGS. 4, 6). CPU controller 24 then records the first upward transition of data 1 in step 43 and the first upward transition of data 2 in step 44. The earliest transition (lowest value of A or B) is set as the first compacted data in step 45 (FIG. 6) and as recorded in data 3 column (FIG. 4). In step 46 the number of the time period is checked against the time when both data 1 and data 2 have changed. In step 47 the time of C is checked against the time of A and in the example of FIGS. 3-5, C is less than A, but not less than B in step 48. At this time (time 1) the level of the data 1 signal is zero (in step 49). The level is set to a one in step 50 in preparation for the next check in level changes of data 1 and data 2 from high to low. Step 51 finds that more level changes are going to occur. Step 52 observes from FIG. 4 that the next transition (downward) in data occurs at time 8. In step 53 the OR function does not change at time 8 because of the downward transition of data 2. At time 9 step 54 sets data 3 as the OR function of data 1 and data 2 of FIG. 4 and in step 55 this time (time 9) is stored as compacted data 3. A return to step 45 sets the CPU ready to check for upward changes in compacted data 1 and data 2.

When the complete set of compacted data of FIG. 4 has been processed according to the flow chart of FIG. 4, the result is compared to a standard to determine if a part being tested falls within acceptable test limits.

Although the best mode contemplated for carrying out the present invention has been herein shown and described, it will be apparent that modification and variation may be made without departing from what is regarded to be the subject matter of the invention.

What is claimed is:

1. An apparatus for comparing a first signal with a second signal, comprising:
    a clock which measures time;
    means for initializing the first signal and the second signal each to a low value;
    means for determining the time indicated by the clock at which the first signal changes signal level;
    means for determining the time indicated by the clock at which the second signal changes signal level; and
    a logic comparison means for comparing the first signal and the second signal and generating a third signal utilizing the determined times at which the first signal and the second signal change signal levels, wherein said logic comparison means comprises as OR gate.

2. An apparatus for comparing a first signal with a second signal, comprising:
    a clock which measures time;
    means for initializing the first signal and the second signal each to a low value;
    means for determining the time indicated by the clock at which the first signal changes signal level;
    means for determining the time indicated by the clock at which the second signal changes signal level; and
    a logic comparison means for comparing the first signal and the second signal and generating a third signal utilizing the determined times at which the first signal and the second signal change signal levels, wherein the comparison means comprises an AND gate.

3. An apparatus for comparing a first signal with a second signal, comprising:
    a clock which measures time;
    means for initializing the first signal and the second signal each to a low value;
    means for determining the time indicated by the clock at which the first signal changes signal level;
    means for determining the time indicated by the clock at which the second signal changes signal level; and
    a logic comparison means for comparing the first signal and the second signal and generating a third signal utilizing the determined times at which the first signal and the second signal change signal levels, wherein the comparison means comprises an Exclusive OR gate.

* * * * *